United States Patent
Barsness et al.

(10) Patent No.: US 7,844,952 B2
(45) Date of Patent: Nov. 30, 2010

(54) GROUPING THREADS IN A DEBUGGER DISPLAY

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1377 days.

(21) Appl. No.: 11/316,286

(22) Filed: Dec. 22, 2005

(65) Prior Publication Data

US 2007/0150867 A1    Jun. 28, 2007

(51) Int. Cl.
 *G06F 9/44* (2006.01)
(52) U.S. Cl. .................. 717/125; 717/128; 717/129; 717/131
(58) Field of Classification Search .................. 717/125
 See application file for complete search history.

(56) References Cited

U.S. PATENT DOCUMENTS

| | | | |
|---|---|---|---|
| 6,205,571 B1 | 3/2001 | Camporese et al. | |
| 6,311,313 B1 | 10/2001 | Camporese et al. | |
| 6,378,125 B1 * | 4/2002 | Bates et al. | 717/129 |
| 6,611,276 B1 * | 8/2003 | Muratori et al. | 715/772 |
| 2004/0054984 A1 * | 3/2004 | Chong et al. | 717/103 |

OTHER PUBLICATIONS

The p2d2 project: building a portable distributed debugger Robert Hood Proceedings of the SIGMETRICS symposium on Parallel and distributed tools pp. 127-136 Year of Publication: 1996.*

Process clustering for distributed debugging Thomas Kunz Proceedings of the 1993 ACM/ONR workshop on Parallel and distributed debugging pp. 75-84 Year of Publication: 1993.*

Debugging multithreaded programs with MPD Ponamgi, M.K. Hseush, W. Kaiser, G.E. Software, IEEE Publication Date: May 1991 vol. 8, Issue: 3 pp. 37-43.*

A Selection Mechanism to Group Processes in a Parallel Debugger Navaux, P.O.A., Kergommeaux, J.C.D., and Stringhini, D. In Proceedings of PDPTA. 2000.*

Parallel program debugging: interface design and implementation Denise Stringhini IEEE International Symposium on Cluster Computing and the Grid, 2004. CCGrid 2004. Apr. 19-22, 2004 pp. 43-50.*

A Visualization System for Multithreaded Programming Michael Bedy, Steve Carr, Xianglong Huang and Ching.Kuang Shene ACM SIGCSE Bulletin vol. 32 , Issue 1 (Mar. 2000) pp. 1-5 Year of Publication: 2000.*

(Continued)

*Primary Examiner*—Lewis A Bullock, Jr.
*Assistant Examiner*—Paul Mills
(74) *Attorney, Agent, or Firm*—Martin & Associates, LLC; Derek P. Martin

(57) ABSTRACT

A debugger display groups threads according to user-specified criteria. The threads may be grouped by type, by current or historic breakpoints, according to historical debug patterns, based on what thread spawned the thread, based on execution pattern, based on object class in a Java environment, based on Java thread group in a Java environment, or base on other suitable criteria. The grouping of threads is displayed graphically to a user of the debugger, thereby allowing more efficient debugging of multi-threaded computer programs.

22 Claims, 15 Drawing Sheets

300

| Sample Thread Grouping Criteria | |
|---|---|
| Group threads by type | 310 |
| Group threads with current and/or historic breakpoints | 320 |
| Group threads according to historical debug patterns | 330 |
| Group threads based on thread that spawned them | 340 |
| Group threads based on execution pattern | 350 |
| Group threads in Java environment based on Java class associated with thread | 360 |
| Group threads in Java environment based on Java thread group | 370 |

OTHER PUBLICATIONS

Initial experiences with a pattern-oriented parallel debugger Alfred A. Hough Janice E. Cuny Proceedings of the 1988 ACM SIGPLAN and SIGOPS workshop on Parallel and distributed debugging pp. 195-205 Year of Publication: 1988.*

Runtime Visualisation of Object Oriented Software Michael P. Smith and Malcolm Munro Proceedings of the First International Workshop on Visualizing Software for Understanding and Analysis (VISSOFT 02) 2002.*

* cited by examiner

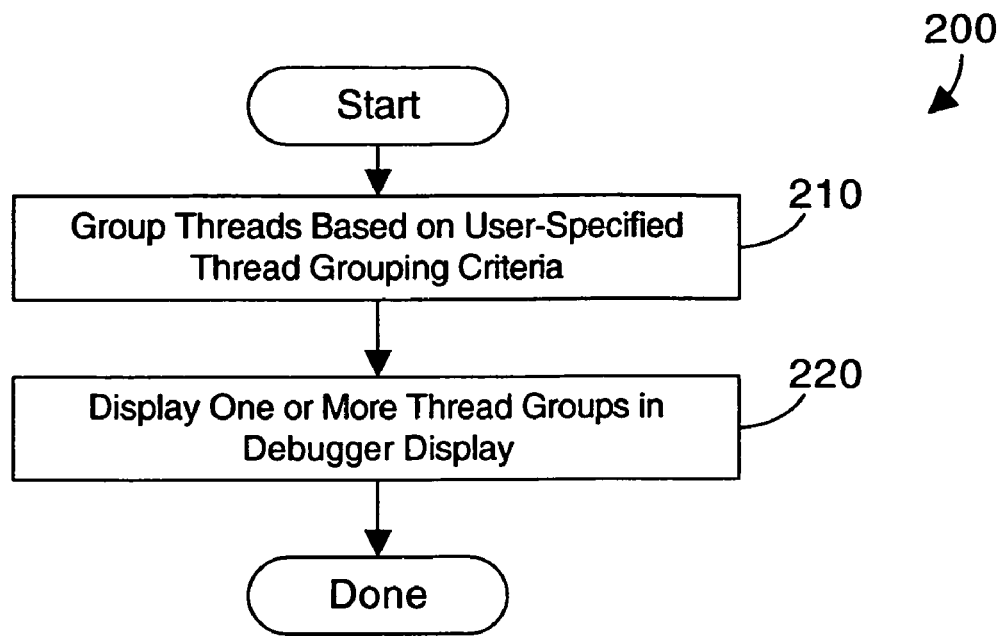

FIG. 2

| Sample Thread Grouping Criteria |
|---|
| Group threads by type — 310 |
| Group threads with current and/or historic breakpoints — 320 |
| Group threads according to historical debug patterns — 330 |
| Group threads based on thread that spawned them — 340 |
| Group threads based on execution pattern — 350 |
| Group threads in Java environment based on Java class associated with thread — 360 |
| Group threads in Java environment based on Java thread group — 370 |

FIG. 3

| Selected Thread Grouping Criteria |
|---|
| Group threads by type — 310 |

| Thread ID | Type |
|---|---|
| 00012 | Servlet Container |
| 00149 | System |
| 00076 | Servlet Container |
| 00031 | Servlet Container |
| 00125 | DB Connection |
| 00153 | System |
| 00109 | Servlet Container |
| 00007 | DB Connection |
| 00082 | System |
| 00164 | Servlet Container |
| 00044 | System |
| 00051 | System |
| 00154 | DB Connection |

FIG. 7

| Selected Thread Grouping Criteria |
|---|
| Group threads with current and/or historic breakpoints — 320 |

| Thread ID | Current Breakpoint | Historical Breakpoint |
|---|---|---|
| 00012 | X | |
| 00149 | | X |
| 00076 | | |
| 00031 | | |
| 00125 | X | |
| 00153 | | |
| 00109 | X | |
| 00007 | | |
| 00082 | | X |
| 00164 | | X |
| 00044 | | |
| 00051 | | X |
| 00154 | X | |

FIG. 10

Debugger 510

File  Edit  Debug  Breakpoint  Actions  Window  Help       520

Thread 00012                                                530

```
9    Result = malloc(100);
10   StrPtr = Result;
11   sprintf(StrPtr,"   %05X   ",Offset);
12   StPtr += 12;
13   i = 0;
14   while (i<Len) {
15       if ((i%8) == 0) {
```

Threads                                                     1140

| Enabled | Thread ID | Initial | Stopped | Module | Line | Statement | Program |
|---------|-----------|---------|---------|--------|------|-----------|---------|
| ☑ | 00012 | | | Test1 | 87 | 84 | TestProg |
| ☑ | 00125 | 1150 | | Test1 | 12 | 61 | TestProg |
| ☑ | 00109 | | | Test1 | 51 | 58 | TestProg |
| ☑ | 00154 | | | Test1 | 75 | 88 | TestProg |
| ☑ | 00149 | | | Test1 | 17 | 42 | TestProg |
| ☑ | 00082 | 1160 | | Test1 | 23 | 10 | TestProg |
| ☑ | 00164 | | | Test1 | 68 | 72 | TestProg |
| ☑ | 00051 | | | Test1 | 20 | 37 | TestProg |
| ☑ | 00076 | | | Test1 | 30 | 49 | TestProg |
| ☑ | 00031 | | | Test1 | 92 | 29 | TestProg |
| ☑ | 00153 | 1170 | | Test1 | 44 | 56 | TestProg |
| ☑ | 00044 | | | Test1 | 81 | 25 | TestProg |
| ☑ | 00007 | | | Test1 | 76 | 93 | TestProg |

FIG. 11

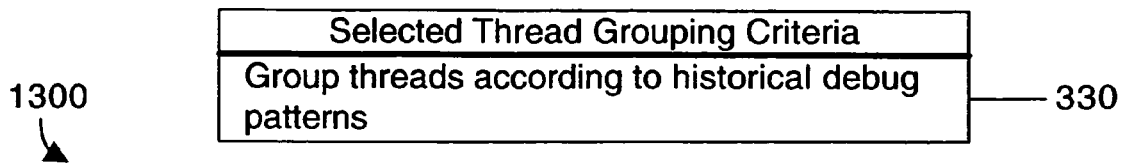

FIG. 12

| Historical Debug Pattern |
|---|
| 149, 31, 44, 7 |
| 125, 164, 76 |
| 153, 51 |

| Debugger | | | 510 | | | | |
|---|---|---|---|---|---|---|---|
| File  Edit  Debug  Breakpoint  Actions  Window  Help       520 | | | | | | | |
| Thread 00012                                                                                   530 | | | | | | | |
| 9     Result = malloc(100);<br>10    StrPtr = Result;<br>11    sprintf(StrPtr," %05X ",Offset);<br>12    StPtr += 12;<br>13    i = 0;<br>14    while (i<Len) {<br>15         if ((i%8) == 0) { | | | | | | | |
| Threads                                                                                         1440 | | | | | | | |
| Enabled | Thread ID | Initial | Stopped | Module | Line | Statement | Program |
| ☑ | 00149 | | | Test1 | 17 | 42 | TestProg |
| ☑ | 00031 | 1450 | | Test1 | 92 | 29 | TestProg |
| ☑ | 00044 | | | Test1 | 81 | 25 | TestProg |
| ☑ | 00007 | | | Test1 | 76 | 93 | TestProg |
| ☑ | 00125 | | | Test1 | 12 | 61 | TestProg |
| ☑ | 00164 | 1460 | | Test1 | 68 | 72 | TestProg |
| ☑ | 00076 | | | Test1 | 30 | 49 | TestProg |
| ☑ | 00153 | 1470 | | Test1 | 44 | 56 | TestProg |
| ☑ | 00051 | | | Test1 | 20 | 37 | TestProg |
| ☑ | 00012 | | | Test1 | 87 | 84 | TestProg |
| ☑ | 00109 | 1480 | | Test1 | 51 | 58 | TestProg |
| ☑ | 00154 | | | Test1 | 75 | 88 | TestProg |
| ☑ | 00082 | | | Test1 | 23 | 10 | TestProg |

FIG. 14

| Selected Thread Grouping Criteria |
|---|
| Group threads based on thread that spawned them — 340 |

| Thread ID | Parent Thread |
|---|---|
| 00012 | |
| 00149 | |
| 00076 | |
| 00031 | 149 |
| 00125 | |
| 00153 | 149 |
| 00109 | 153 |
| 00007 | |
| 00082 | 125 |
| 00164 | |
| 00044 | 7 |
| 00051 | |
| 00154 | |

FIG. 16

Debugger 510     _ ☐ ✕

File   Edit   Debug   Breakpoint   Actions   Window   Help     520

Thread 00012                                                530

```
9    Result = malloc(100);
10   StrPtr = Result;
11   sprintf(StrPtr," %05X ",Offset);
12   StPtr += 12;
13   i = 0;
14   while (i<Len) {
15       if ((i%8) == 0) {
```

Threads                                                                   1740

| Enabled | Thread ID | Initial | Stopped | Module | Line | Statement | Program |
|---------|-----------|---------|---------|--------|------|-----------|---------|
| ☑ | 00149 | | | Test1 | 17 | 42 | TestProg |
| ☑ | 00031 | | 1750 | Test1 | 92 | 29 | TestProg |
| ☑ | 00153 | | | Test1 | 44 | 56 | TestProg |
| ☑ | 00109 | | | Test1 | 51 | 58 | TestProg |
| ☑ | 00125 | | 1760 | Test1 | 12 | 61 | TestProg |
| ☑ | 00082 | | | Test1 | 23 | 10 | TestProg |
| ☑ | 00007 | | 1770 | Test1 | 76 | 93 | TestProg |
| ☑ | 00044 | | | Test1 | 81 | 25 | TestProg |
| ☑ | 00012 | | | Test1 | 87 | 84 | TestProg |
| ☑ | 00154 | | | Test1 | 75 | 88 | TestProg |
| ☑ | 00164 | 1780 | | Test1 | 68 | 72 | TestProg |
| ☑ | 00051 | | | Test1 | 20 | 37 | TestProg |
| ☑ | 00076 | | | Test1 | 30 | 49 | TestProg |

| Selected Thread Grouping Criteria |
|---|
| Group threads based on execution pattern — 350 |

FIG. 18

| Historical Execution Pattern |
|---|
| 76, 125 |
| 7, 44, 12, 154 |
| 31, 109 |

Debugger  510

File  Edit  Debug  Breakpoint  Actions  Window  Help   520

Thread 00012                                                                530
```
9    Result = malloc(100);
10   StrPtr = Result;
11   sprintf(StrPtr,"   %05X   ",Offset);
12   StPtr += 12;
13   i = 0;
14   while (i<Len) {
15        if ((i%8) == 0) {
```

Threads                                                                     2040

| Enabled | Thread ID | Initial | Stopped | Module | Line | Statement | Program |
|---|---|---|---|---|---|---|---|
| ☑ | 00076 | 2050 | | Test1 | 30 | 49 | TestProg |
| ☑ | 00125 | | | Test1 | 12 | 61 | TestProg |
| ☑ | 00007 | | | Test1 | 76 | 93 | TestProg |
| ☑ | 00044 | 2060 | | Test1 | 81 | 25 | TestProg |
| ☑ | 00012 | | | Test1 | 87 | 84 | TestProg |
| ☑ | 00154 | | | Test1 | 75 | 88 | TestProg |
| ☑ | 00031 | 2070 | | Test1 | 92 | 29 | TestProg |
| ☑ | 00109 | | | Test1 | 51 | 58 | TestProg |
| ☑ | 00149 | | | Test1 | 17 | 42 | TestProg |
| ☑ | 00164 | | | Test1 | 68 | 72 | TestProg |
| ☑ | 00153 | 2080 | | Test1 | 44 | 56 | TestProg |
| ☑ | 00051 | | | Test1 | 20 | 37 | TestProg |
| ☑ | 00082 | | | Test1 | 23 | 10 | TestProg |

FIG. 20

| Selected Thread Grouping Criteria |
|---|
| Group threads in Java environment based on Java class associated with thread — 360 |

2200

| Thread ID | Java Class |
|---|---|
| 00012 | Copy |
| 00149 | Properties |
| 00076 | Echo |
| 00031 | System |
| 00125 | Security |
| 00153 | Util |
| 00109 | Text |
| 00007 | System |
| 00082 | IO |
| 00164 | Util |
| 00044 | Security |
| 00051 | System |
| 00154 | IO |

| Selected Thread Grouping Criteria |
|---|
| Group threads in Java environment based on Java thread group |

| Thread ID | Java Thread Group |
|---|---|
| 00012 | A |
| 00149 | B |
| 00076 | C |
| 00031 | A |
| 00125 | D |
| 00153 | B |
| 00109 | D |
| 00007 | A |
| 00082 | A |
| 00164 | C |
| 00044 | D |
| 00051 | B |
| 00154 | D |

FIG. 25

Debugger 510

File  Edit  Debug  Breakpoint  Actions  Window  Help      520

Thread 00012                                          530

```
9    Result = malloc(100);
10   StrPtr = Result;
11   sprintf(StrPtr," %05X ",Offset);
12   StPtr += 12;
13   i = 0;
14   while (i<Len) {
15        if ((i%8) == 0) {
```

Threads                                              2640

| Enabled | Thread ID | Initial | Stopped | Module | Line | Statement | Program |
|---------|-----------|---------|---------|--------|------|-----------|---------|
| ☑ | 00012 |  |  | Test1 | 87 | 84 | TestProg |
| ☑ | 00031 |  |  | Test1 | 92 | 29 | TestProg |
| ☑ | 00007 | 2650 |  | Test1 | 76 | 93 | TestProg |
| ☑ | 00082 |  |  | Test1 | 23 | 10 | TestProg |
| ☑ | 00149 |  |  | Test1 | 17 | 42 | TestProg |
| ☑ | 00153 | 2660 |  | Test1 | 44 | 56 | TestProg |
| ☑ | 00051 |  |  | Test1 | 20 | 37 | TestProg |
| ☑ | 00076 | 2670 |  | Test1 | 30 | 49 | TestProg |
| ☑ | 00164 |  |  | Test1 | 68 | 72 | TestProg |
| ☑ | 00125 |  |  | Test1 | 12 | 61 | TestProg |
| ☑ | 00109 | 2680 |  | Test1 | 51 | 58 | TestProg |
| ☑ | 00044 |  |  | Test1 | 81 | 25 | TestProg |
| ☑ | 00154 |  |  | Test1 | 75 | 88 | TestProg |

FIG. 26

GROUPING THREADS IN A DEBUGGER DISPLAY

BACKGROUND OF THE INVENTION

1. Technical Field

This invention generally relates to computer systems, and more specifically relates to the debugging of multi-threaded computer programs.

2. Background Art

As the sophistication and complexity of computer hardware and software increase, the more difficult the software is to debug. Debugging is the process of finding problems, or "bugs", during the development of a computer program. Most modern programming environments include a debugger that provides tools for testing and debugging a computer program. Known debuggers allow the user to set one or more breakpoints in the computer program, which are points where the execution of the computer program is stopped so that the state of the program can be examined to verify that the program executed as designed.

In a multi-threaded computer program, multiple threads of execution are defined. Different threads of execution may be executed in parallel. In a computer system that has multiple processors, different threads of execution may be executed on different processors, providing true real-time parallel processing of the threads. In some computer systems, such as the BlueGene computer system developed by IBM, there may be many thousands of threads executing at the same time. Even on more traditional computer system such as the eServer iSeries developed by IBM, some WebSphere applications may have hundreds of threads. Debugging a multi-threaded computer program with a large number of threads is difficult. Prior art debuggers display threads in the order they were created. However, when there are a large number of threads, debugging is still difficult. Without a mechanism and method for grouping threads based on user-specified criteria, programmers will continue to suffer from inefficient tools for debugging multi-threaded computer programs.

DISCLOSURE OF INVENTION

According to the preferred embodiments, a debugger display groups threads according to user-specified criteria. The threads may be grouped by type, by current and/or historic breakpoints, according to historical debug patterns, based on what thread spawned the thread, based on execution pattern, based on object class in a Java environment, based on Java thread group in a Java environment, or based on other suitable criteria. The grouping of threads is displayed graphically to a user of the debugger, thereby allowing more efficient debugging of multi-threaded computer programs.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is flow diagram of a method in accordance with the preferred embodiments;

FIG. 3 is a table showing sample thread grouping criteria within the scope of the preferred embodiments;

FIG. 6 is a first sample thread grouping criteria in accordance with the preferred embodiments;

FIG. 7 is a table showing types of threads for the threads shown in FIG. 5;

FIG. 9 is a second sample thread grouping criteria in accordance with the preferred embodiments;

FIG. 10 is a table showing current and historical breakpoint information for the threads shown in FIG. 5;

FIG. 11 is a sample debugger display showing the display of multiple threads according to current and historical breakpoint information as shown in FIGS. 9 and 10;

FIG. 12 is a third sample thread grouping criteria in accordance with the preferred embodiments;

FIG. 13 is a table showing historical debug patterns for the threads shown in FIG. 5;

FIG. 14 is a sample debugger display showing the display of multiple threads according to historical debug patterns as shown in FIGS. 12 and 13;

FIG. 15 is a fourth sample thread grouping criteria in accordance with the preferred embodiments;

FIG. 16 is a table showing parent threads for the threads shown in FIG. 5;

FIG. 17 is a sample debugger display showing the display of multiple threads according to their parent threads as shown in FIGS. 15 and 16;

FIG. 18 is a fifth sample thread grouping criteria in accordance with the preferred embodiments;

FIG. 19 is a table showing historical execution patterns for the threads shown in FIG. 5;

FIG. 20 is a sample debugger display showing the display of multiple threads according to the historical execution pattern as shown in FIGS. 18 and 19;

FIG. 24 is a seventh sample thread grouping criteria in accordance with the preferred embodiments;

FIG. 25 is a table showing Java thread groups for the threads shown in FIG. 5; and FIG. 26 is a sample debugger display showing the display of multiple threads according to their Java thread groups as shown in FIGS. 24 and 25.

BEST MODE FOR CARRYING OUT THE INVENTION

The preferred embodiments order threads in a debugger display according to user-specified criteria. The user-specified criteria may specify grouping by thread type, by current and/or historic breakpoints, according to historical debug patterns, based on what thread spawned the thread, based on execution pattern, based on object class in a Java environment, and based on Java thread group in a Java environment.

The grouping of threads is displayed graphically to a user of the debugger, thereby allowing more efficient debugging of multi-threaded computer programs.

Figure 1:
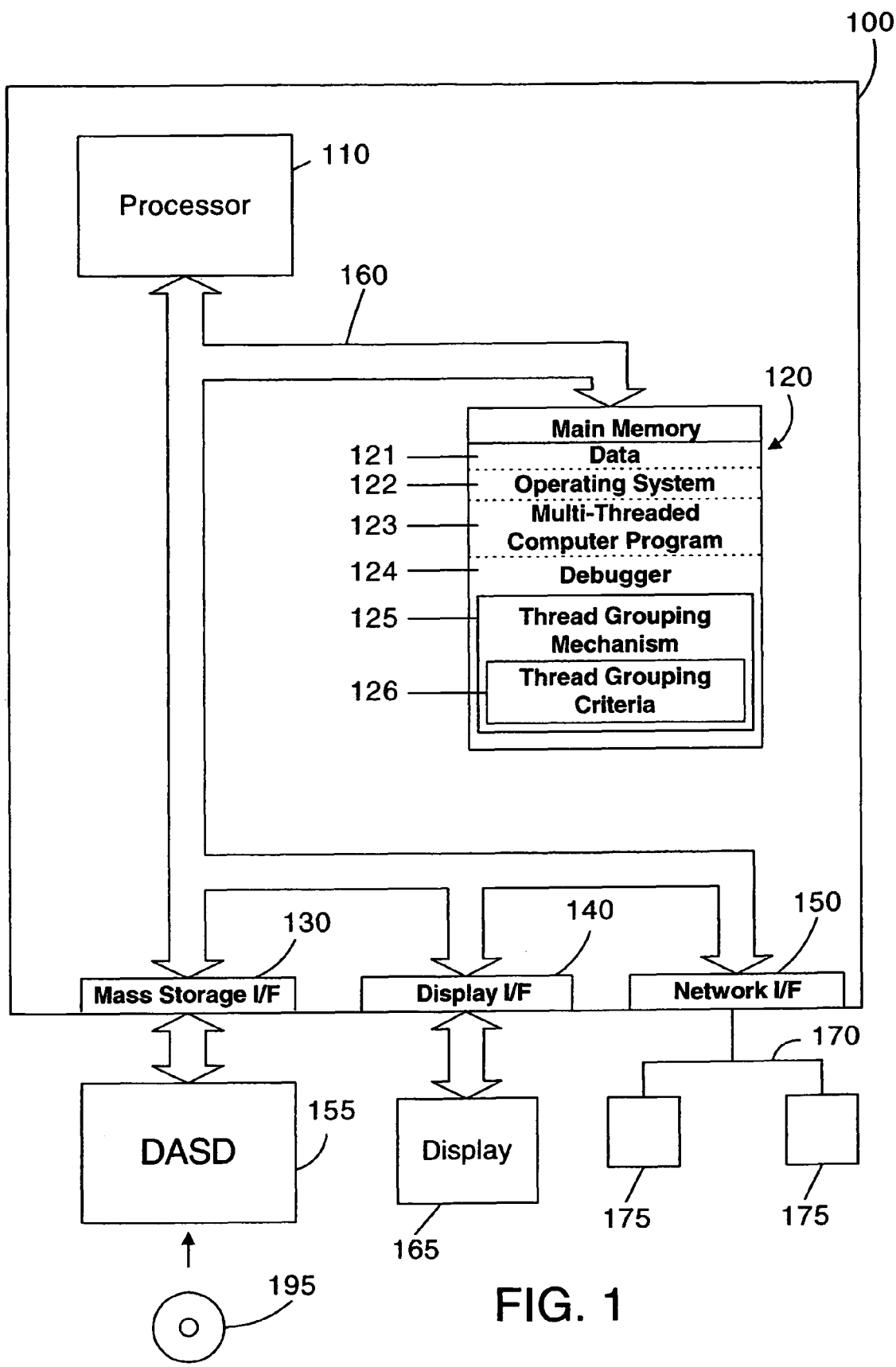
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a multi-threaded computer program 123, and a debugger 124. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Multi-threaded program 123 represents any computer software that includes multiple threads of execution. Debugger 124 includes a thread grouping mechanism 125 that groups threads in the display of the debugger 124 according to one or more user-specified thread grouping criteria 126.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, multi-threaded computer program 123, and debugger 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links. Note that the preferred signal bearing media is tangible.

Referring to FIG. 2, a method 200 in accordance with the preferred embodiments groups threads based on user-specified thread grouping criteria (step 210). One or more of the thread groups are then displayed in the debugger display (step 220). Note that step 220 does not necessarily display all of the thread groups because the number of threads and groups may be too large to fit on the display at one time. Of course, traditional display mechanisms such as scroll bars may be used to essentially provide all of the threads and groups to the user, with the ability to navigate in the display to a desired group or thread. Other known methods may also be used to enhance the display of threads and thread groups. For example, a twisty could be defined for a group, and the user could then select a closed twisty to open the twisty to show all of the threads in that group, or may select an open twisty to close the twisty to conceal all of the threads in that group. Note that a group may include one or more threads, and the preferred embodiments extend to any suitable number of groups, as long as one of the groups includes multiple threads.

Referring to FIG. 3, a table 300 shows sample thread grouping criteria that are within the scope of the preferred embodiments. Suitable thread grouping criteria include: grouping threads by type (310); grouping threads with current and/or historic breakpoints (320); grouping threads according to historical debug patterns (330); grouping threads based on the thread that spawned them (340); grouping threads based on execution pattern (350); grouping threads based on Java class (360); and grouping threads based on Java thread group (370). Note that other criteria for grouping threads could also be specified, and the preferred embodiments expressly extend to any and all user-specified criteria for grouping threads in a debugger display.

Figures 4, 5:
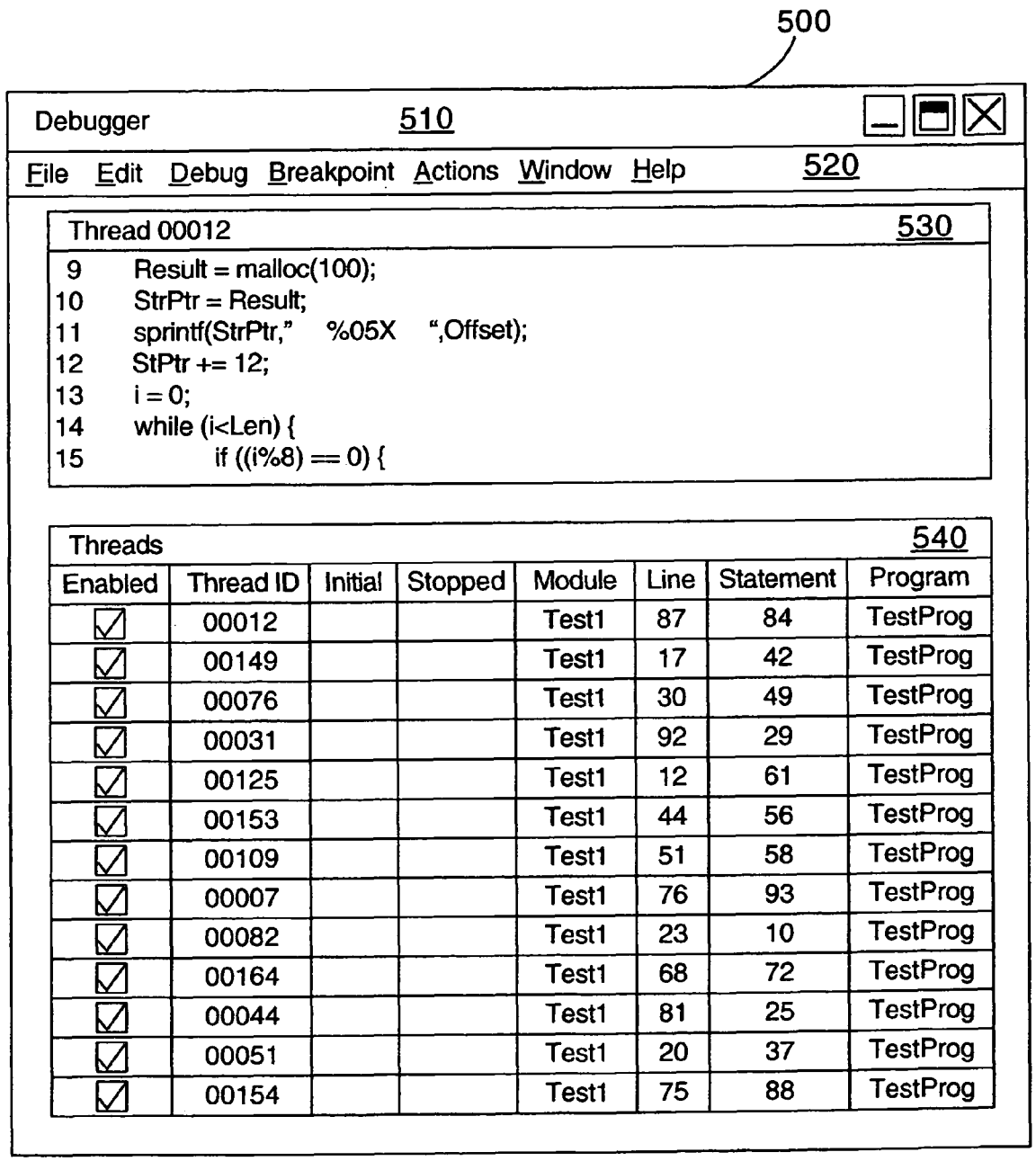
FIG. 4 shows prior art thread listing criteria that specifies that threads are listed in the debugger according to the order of their creation.
FIG. 5 is a sample debugger display showing the display of multiple threads according to the order of their creation as shown in FIG. 4.

Referring to FIG. 4, prior art debuggers simply list threads in the order the threads were created (410). Referring to FIG. 5, a display window 500 is the display for a debugger, as shown in the title bar 510. The display includes a menu bar 520 that provide various menu functions for the debugger. The providing of menu functions is well-known in the art of graphical user interfaces. Two windows 530 and 540 are provided. Window 530 shows the program trace for a selected thread, thread 12 for this example. Note that the leading zeroes for thread numbers in FIG. 5 are dropped in this specification for the sake of convenience. Window 540 shows a list of all threads, and provides status information for the threads. We assume that the thread listing in window 540 is according to the order of creation of the threads. Thus, thread 00012 was created first, thread 00149 was created second, and so on through thread 00154, which was created last of the displayed threads. We now present several examples to illustrate how the preferred embodiments group threads to provide enhanced debugging capability for multi-threaded computer programs in a debugger.

Figure 8:
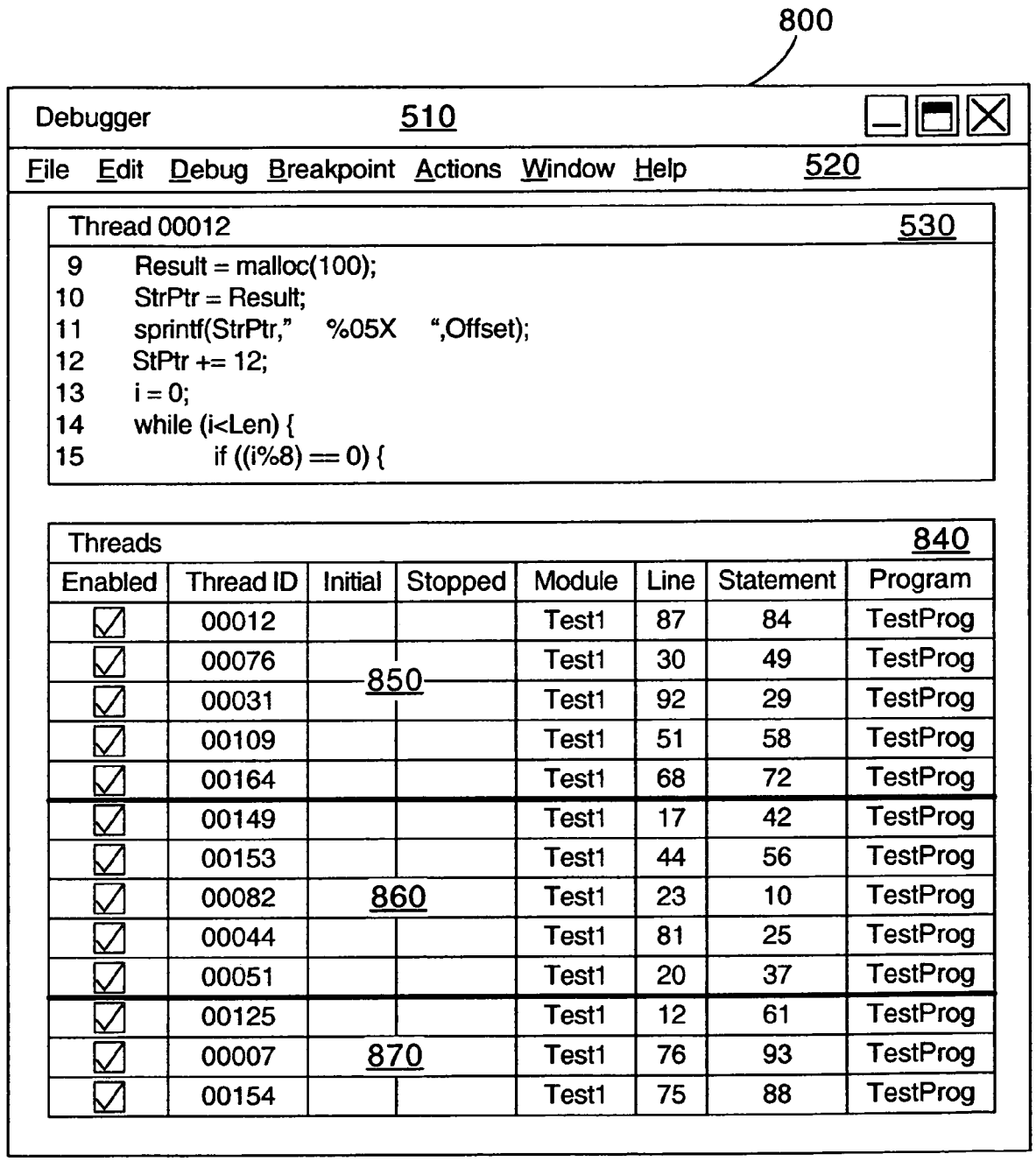
FIG. 8 is a sample debugger display showing the display of multiple threads according to type as shown in FIGS. 6 and 7.

Referring to FIG. 6, a first selected thread grouping criteria is to group the threads according to type (310). The type of a thread can be determined in any suitable way. One suitable way to group threads according to type uses the names of the threads as a thread grouping criterion. Most professionally-developed applications use conventions when naming their threads, which makes it possible to group threads according to the names of the threads. For example, in WebSphere, threads that are used to compile byte codes into machine code are named with the prefix jitcompilethread; threads that communicate with the client request are named with the prefix Servlet.Engine.Transports; threads that deal with communications via sockets are named with the prefix ASocketThreadPool; and threads that are used to communicate with database jobs are named with the prefix ThreadedServer. Thus, all threads that include Servlet.Engine.Transports as part of the thread name could be grouped together. Threads that include a similar common name could also be grouped together. Referring to FIG. 7, a table 700 specifies a type for each thread shown in the prior art display of FIG. 5. The thread type could be derived, for example, from the name of the thread as discussed above. We assume that threads 12, 76, 31, 109, and 164 are Servlet Container threads. We assume that threads 149, 153, 82, 44 and 51 are System threads. We further assume that threads 125, 7, and 154 are Database Connection threads. With the assumptions shown in table 700 in FIG. 7 and the user-specified thread grouping criteria 310 shown in FIG. 6, a display window 800 in FIG. 8 includes a window 840 that shows the threads in groups according to their type. Thus, all the threads that are Servlet Container threads are shown in the first group 850; all the threads that are System threads are shown in the second group 860; and all the threads that are Database Connection threads are shown in the third group 870. The groups in the examples herein are shown separated by thick lines to show the boundaries between groups. One skilled in the art will recognize there are numerous known graphical techniques could be used to visually indicate grouping of threads. For example, the threads could have been left in the same order shown in FIG. 5, with each thread type being displayed in a different color. In this manner, the grouping of threads is not done by placing the threads next to each other in the display, but by coloring. The preferred embodiments extend to any suitable way for indicating group membership of any or all of the threads in a debugger display.

Referring to FIG. 9, a second selected thread grouping criteria is to group the threads according to current and/or historic breakpoints (320). Referring to FIG. 10, a table 1000 shows those threads in the prior art display of FIG. 5 that have current breakpoints set, and those that have had breakpoint set in the past (i.e., historical breakpoints). With the assumptions shown in table 1000 in FIG. 10 and the user-specified thread grouping criteria 320 shown in FIG. 9, a display window 1100 in FIG. 11 includes a window 1140 that shows the threads in groups according to current and historical breakpoints. Thus, all the threads that have current breakpoints set are shown in the first group 1150; all the threads that have had breakpoints set in the past (historical breakpoints) are shown in the second group 1160; and all the threads that don't have current or historical breakpoints are shown in the third group 1170.

Referring to FIG. 12, a third selected thread grouping criteria is to group the threads according to historical debug patterns (330). Referring to FIG. 13, a table 1300 shows historical debug patterns. Thus, we see from the data in table 1300 that a first group is defined to include threads 149, 31, 44 and 7, because a breakpoint in thread 149 is typically followed by a breakpoint in thread 31, followed by a breakpoint in thread 44, followed by a breakpoint in thread 7. A second group is defined to include threads 125, 164 and 76 because a breakpoint in thread 125 is typically followed by a breakpoint in thread 164, followed by a breakpoint in thread 76. A third group is defined to include threads 153 and 51 because a breakpoint in thread 153 is typically followed by a breakpoint in thread 51. With the assumptions shown in table 1300 in FIG. 13 and the user-specified thread grouping criteria 330 shown in FIG. 12, a display window 1400 in FIG. 14 includes a window 1440 that shows the threads in groups according to historical debug patterns. Thus, all the threads in the first group are shown in group 1450; all the threads in the second group are shown at 1460; all the threads in the third group are shown at 1470; and all the remaining threads that have no historical debug pattern are shown in the fourth group at 1480.

Referring to FIG. 15, a fourth selected thread grouping criteria is to group the threads based on the thread that spawned them (340). Oftentimes applications are written such that spawned threads are doing work on behalf of a parent thread. Referring to FIG. 16, a table 1600 shows which threads have parent threads, and the thread number of each parent thread. Thus, we see from the data in table 1600 that thread 31 has a parent thread of 149; thread 153 has a parent thread of 149; thread 109 has a parent thread of 153; thread 82 has a parent thread of 125; and thread 44 has a parent thread of 7. Now groups can be defined based on the parent threads. Threads 149, 31, and 153 could be grouped in a first group because threads 31 and 153 were spawned by parent thread 149. In addition, thread 109 could also be included in the first group because thread 109 was spawned by thread 153, which was spawned by thread 149. A second group could be defined to include thread 82 because it was spawned by thread 125. A third group could be defined to include thread 44 because it was spawned by thread 7. With the assumptions shown in table 1600 in FIG. 16 and the user-specified thread grouping criteria 340 shown in FIG. 15, a display window 1700 in FIG. 17 includes a window 1740 that shows the threads in groups according to their parent threads. Thus, all the threads in the first group are shown in group 1750; all the threads in the second group are shown at 1760; all the threads in the third group are shown at 1770; and all the remaining threads that have no parent thread are shown in the fourth group at 1780.

Referring to FIG. 18, a fifth selected thread grouping criteria is to group the threads based on execution pattern of the threads (350). One suitable example of execution pattern is the sequence of execution of the threads. Referring to FIG. 19, a table 1900 shows historical execution patterns for the threads in FIG. 5. Thus, we see from the data in table 1900 that thread 76 is executed, followed by thread 125. Thus, threads 76 and 125 may form a first group. Thread 7 is executed, followed by thread 44, then thread 12, then thread 154. Thus, threads 7, 44, 12, and 154 may form a second group. Thread 31 is executed, followed by thread 109. Thus, threads 31 and 109 may form a third group. With the assumptions shown in table 1900 in FIG. 19 and the user-specified thread grouping criteria 350 shown in FIG. 18, a display window 2000 in FIG. 20 includes a window 2040 that shows the threads in groups according to their execution pattern. Thus, all the threads in the first group are shown in group 2050; all the threads in the second group are shown at 2060; all the threads in the third group are shown at 2070; and all the remaining threads that have no historical execution pattern are shown in the fourth group at 2080.

Figures 21, 22:
FIG. 21 is a sixth sample thread grouping criteria in accordance with the preferred embodiments.
FIG. 22 is a table showing Java classes that execute the threads shown in FIG. 5.
Figure 23:
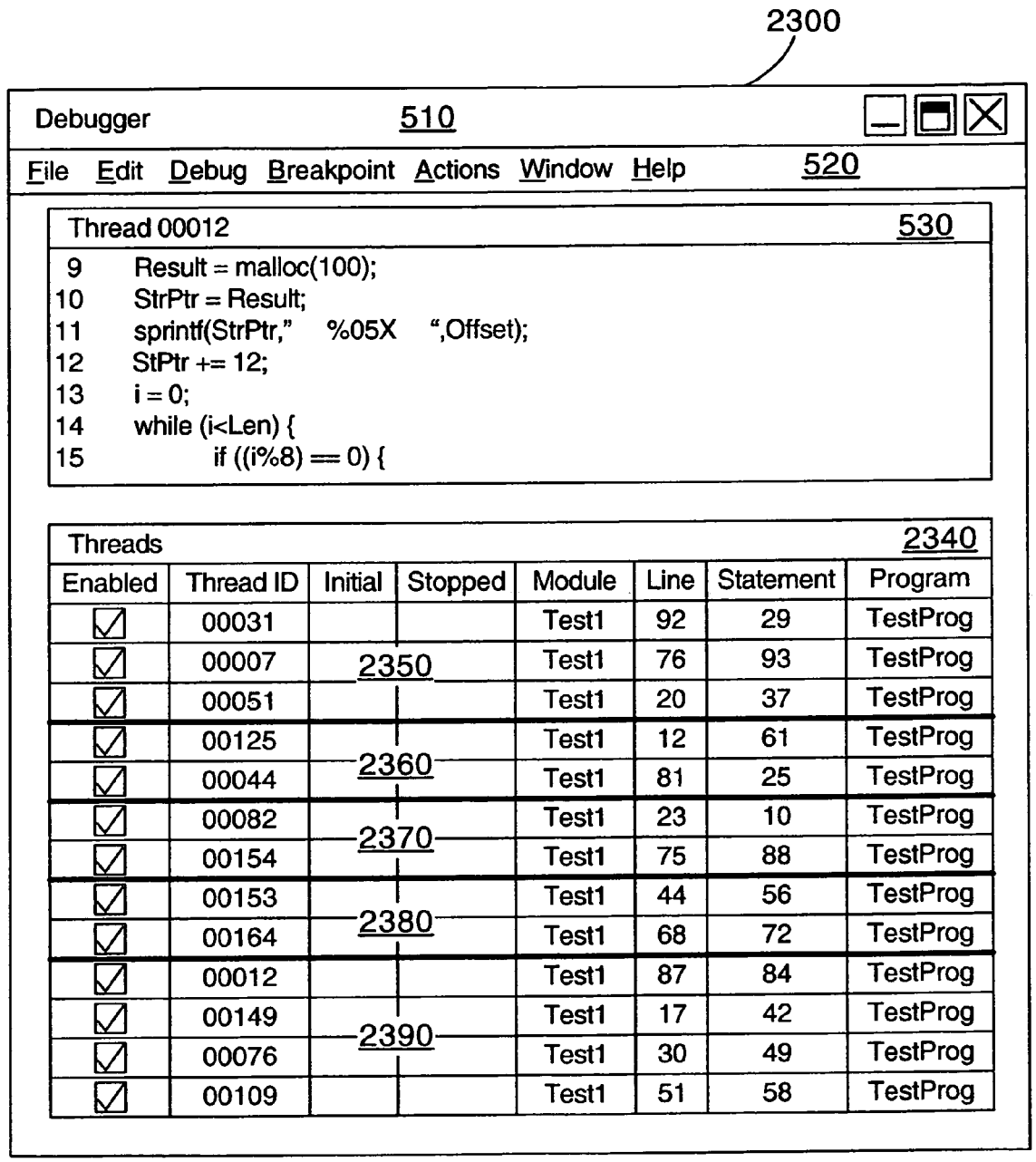
FIG. 23 is a sample debugger display showing the display of multiple threads according to their Java classes as shown in FIGS. 21 and 22.

Referring to FIG. 21, a sixth selected thread grouping criteria is to group the threads based on type of Java object (i.e., Java class) associated with the threads (360). Referring to FIG. 22, a table 2200 shows Java classes associated with the threads in FIG. 5. Thus, we see from the data in table 2200 that thread 12 is associated with the Copy class; thread 149 is associated with the Properties class; thread 76 is associated with the Echo class; threads 31, 7 and 51 are associated with the System class; threads 125 and 44 are associated with the Security class; threads 153 and 164 are associated with the Util class; thread 109 is associated with the Text class; and threads 82 and 154 are associated with the IO class. This Java class information in table 2200 may then be used to form groups. A first group could be defined to include the most threads of any class, which would be threads 31, 7 and 51 of the System class. A second group could be defined to include threads 125 and 44 of the Security class. A third group could be defined to include threads 82 and 154 of the IO class. A fourth group could be defined to include threads 153 and 164 of the Util class. A fifth group could be defined to include the remaining threads. With the assumptions shown in table 2200 in FIG. 22 and the user-specified thread grouping criteria 360 shown in FIG. 21, a display window 2300 in FIG. 23 includes a window 2340 that shows the threads in groups according to their Java class. Thus, all the threads in the first group are shown in group 2350; all the threads in the second group are shown at 2360; all the threads in the third group are shown at 2370; all the threads in the fourth group are shown at 2380; and all the remaining threads are shown in the fifth group at 2390.

Referring to FIG. 24, a seventh selected thread grouping criteria is to group the threads based on Java thread group (370). Referring to FIG. 25, a table 2500 shows Java thread groups associated with the threads in FIG. 5. Thus, we see from the data in table 2500 that threads 12, 31, 7, and 82 are in thread group A; threads 149, 153, and 51 are in thread group B; threads 76 and 164 are in thread group C; and threads 125, 109, 44 and 154 are in thread group D. The threads in each of these four groups can be grouped in the debugger display. With the assumptions shown in table 2500 in FIG. 25 and the user-specified thread grouping criteria 370 shown in FIG. 24, a display window 2600 in FIG. 26 includes a window 2640 that shows the threads in groups according to their Java thread group. Thus, all the threads in the group A are shown at 2650; all the threads in group B are shown at 2660; all the threads in group C are shown at 2670; and all the threads in group D are shown at 2680.

The preferred embodiments group threads in a debugger display according to any suitable user-specified criteria By grouping threads, the debugging of a multi-threaded computer program is much easier to perform.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
    at least one processor;
    a memory coupled to the at least one processor;
    a multi-threaded computer program residing in the memory, the multi-threaded computer program comprising a plurality of threads; and
    a debugger residing in the memory and executed by the at least one processor, the debugger executing the multi-threaded computer program, providing an interface from which a user specifies a criterion from one or more selectable criteria for grouping at least two of the plurality of threads into a plurality of groups, and displaying the plurality of groups in a manner that visually distinguishes between threads in each of the plurality of groups in a display, wherein the one or more selectable criteria comprises at least a first criterion which specifies to group the at least two threads according to current and historical breakpoints which defines the plurality of groups as a first group of threads that have current breakpoints set, a second group of threads that have historical breakpoints, and a third group of threads that have no current breakpoints set and no historical breakpoints, wherein a thread having historical breakpoints comprises a thread which has had breakpoints set in the past.

2. The apparatus of claim 1 wherein the one or more selectable criteria further comprises a second criterion which specifies to group the at least two threads according to thread type.

3. The apparatus of claim 1 wherein the one or more selectable criteria further comprises a second criterion which specifies to group the at least two threads according to historical debug patterns that each define a series of breakpoints in different threads.

4. The apparatus of claim 1 wherein the one or more selectable criteria further comprises a second criterion which specifies to group the at least two threads according to parent threads, if any, that spawned the at least two threads, defining the plurality of groups as a first group of threads that have a first parent thread, a second group of threads that have a second parent thread, and a third group of threads that have no parent thread.

5. The apparatus of claim 1 wherein the one or more selectable criteria further comprises a second criterion which specifies to group the threads according to historical execution pattern for the at least two threads that specifies order of execution of the threads.

6. The apparatus of claim 1 wherein the one or more selectable criteria further comprises a second criterion which specifies to group the at least two threads according to Java class for each of the at least two threads.

7. The apparatus of claim 1 wherein the one or more selectable criteria further comprises a second criterion which specifies to group the at least two threads according to Java thread group for each of the at least two threads.

8. A computer-implemented method for displaying a plurality of threads in a debugger, the method comprising the steps of:

(A) providing an interface from which a user specifies a criterion from one or more selectable criteria for grouping at least two of the plurality of threads into a plurality of groups; and (B) displaying to the user the plurality of groups in a manner that visually distinguishes between threads in each of the plurality of groups in a display, wherein the one or more selectable criteria comprises at least a first criterion which specifies to group the at least two threads according to current and historical breakpoints which defines the plurality of groups as a first group of threads that have current breakpoints set, a second group of threads that have historical breakpoints, and a third group of threads that have no current breakpoints set and no historical breakpoints, wherein a thread having historical breakpoints comprises a thread which has had breakpoints set in the past.

9. The method of claim 8 wherein the one or more selectable criteria further comprises a second criterion which specifies to group the at least two threads according to thread type.

10. The method of claim 8 wherein the one or more selectable criteria further comprises a second criterion which specifies to group the at least two threads according to historical debug patterns that each define a series of breakpoints in different threads.

11. The method of claim 8 wherein the one or more selectable criteria further comprises a second criterion which specifies to group the at least two threads according to parent threads, if any, that spawned the at least two threads, defining the plurality of groups as a first group of threads that have a first parent thread, a second group of threads that have a second parent thread, and a third group of threads that have no parent thread.

12. The method of claim 8 wherein the one or more selectable criteria further comprises a second criterion which specifies to group the at least two threads according to historical execution pattern for the at least two threads that specifies order of execution of the threads.

13. The method of claim 8 wherein the one or more selectable criteria further comprises a second criterion which specifies to group the at least two threads according to Java class for each of the at least two threads.

14. The method of claim 8 wherein the one or more selectable criteria further comprises a second criterion which specifies to group the at least two threads according to Java thread group for each of the at least two threads.

15. A computer-readable program product comprising:

(A) a debugger that executes a multi-threaded computer program and provides an interface from which a user specifies a criterion from one or more selectable criteria which groups at least two of a plurality of threads into a plurality of groups, and displays the plurality of groups in a manner that visually distinguishes between threads in each of the plurality of groups in a display, wherein the one or more selectable criteria comprises at least a first criterion which specifies to group the at least two threads according to current and historical breakpoints which defines the plurality of groups as a first group of threads that have current breakpoints set, a second group of threads that have historical breakpoints, and a third group of threads that have no current breakpoints set and no historical breakpoints, wherein a thread having historical breakpoints comprises a thread which has had breakpoints set in the past; and (B) non-transitory recordable media bearing the debugger.

16. The program product of claim 15 wherein the one or more selectable criteria further comprises a second criterion which specifies to group the at least two threads according to thread type.

17. The program product of claim 15 wherein the one or more selectable criteria further comprises a second criterion which specifies to group the at least two threads according to historical debug patterns that each define a series of breakpoints in different threads.

18. The program product of claim 15 wherein the one or more selectable criteria further comprises a second criterion which specifies to group the at least two threads according to parent threads, if any, that spawned the at least two threads, defining the plurality of groups as a first group of threads that have a first parent thread, a second group of threads that have a second parent thread, and a third group of threads that have no parent thread.

19. The program product of claim 15 wherein the one or more selectable criteria further comprises a second criterion which specifies to group the at least two threads according to historical execution pattern for the at least two threads that specifies order of execution of the threads.

20. The program product of claim 15 wherein the one or more selectable criteria further comprises a second criterion which specifies to group the at least two threads according to Java class for each of the at least two threads.

21. The program product of claim 15 wherein the one or more selectable criteria further comprises a second criterion which specifies to group the at least two threads according to Java thread group for each of the at least two threads.

22. A computer-implemented method for displaying a plurality of threads in a debugger, the method comprising the steps of:

(A) providing an interface for a user to specify a criterion from selectable criteria for grouping the plurality of threads into a plurality of groups, the selectable criteria comprising:

(A1) thread type;

(A2) current and historic breakpoints;

(A3) historical debug patterns that each define a series of breakpoints in different threads;

(A4) parent threads, if any, that spawned the plurality of threads;

(A5) historical execution pattern for the plurality of threads that specifies order of execution of the plurality of threads;

(A6) Java class; and (A7) Java thread group;

(B) grouping at least two of the plurality of threads to define the plurality of groups according to the criterion specified by the user in step (A), wherein the plurality of groups for criterion (A1) each correspond to a different thread type, the plurality of groups for criterion (A2) include a first group of threads that have current breakpoints, a second group of threads that have historical breakpoints, and a third group of threads that have no current and no historical breakpoints, the plurality of groups for criterion (A3) each correspond to a different historical debug pattern, the plurality of groups for criterion (A4) include a fourth group of threads that have a first parent thread, a fifth group of threads that have a second parent thread, and a sixth group of threads that have no parent thread, the plurality of groups for criterion (A5) each correspond to a different historical execution pattern, the plurality of groups for criterion (A6) each correspond to a different Java class, and the plurality of groups for criterion (A7) each correspond to a different Java thread group; and (C) displaying to a user the plurality of groups defined in step (B).

* * * * *